(12) United States Patent
Tinnakornsrisuphap et al.

(10) Patent No.: US 10,154,025 B2
(45) Date of Patent: Dec. 11, 2018

(54) SEAMLESS DEVICE CONFIGURATION IN A COMMUNICATION NETWORK

(71) Applicant: QUALCOMM Incorporated, San Diego, CA (US)

(72) Inventors: Peerapol Tinnakornsrisuphap, San Diego, CA (US); Olivier Jean Benoit, San Diego, CA (US); Rajesh Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/837,703

(22) Filed: Mar. 15, 2013

(65) Prior Publication Data

US 2014/0282960 A1    Sep. 18, 2014

(51) Int. Cl.
H04L 29/06 (2006.01)
H04W 12/06 (2009.01)

(52) U.S. Cl.
CPC ............ *H04L 63/083* (2013.01); *H04L 63/08* (2013.01); *H04W 12/06* (2013.01)

(58) Field of Classification Search
CPC ............ H04L 9/00; H04L 9/32–9/3297; H04L 63/04–63/0492; H04L 63/083; H04L 63/08; H04L 63/0838; H04L 29/06; G06F 15/16; G06F 21/30–21/46; G06F 21/60–21/645; H04W 12/06
USPC ......... 713/168–174, 182–186, 202; 726/2–9; 709/225, 229, 206, 249, 389; 380/255, 380/266, 270, 273
See application file for complete search history.

(56) References Cited

U.S. PATENT DOCUMENTS 7,043,230 B1    5/2006 Geddes et al.
7,243,366 B2    7/2007 Medvinsky et al.
(Continued)

FOREIGN PATENT DOCUMENTS

CN    102299907    12/2011
CN    102638797     8/2012
(Continued)

OTHER PUBLICATIONS

"PCT Application No. PCT/2014/026625 International Search Report and Written Opinion", dated Jun. 26, 2014, 9 pages.
(Continued)

*Primary Examiner* — Ashokkumar B Patel
*Assistant Examiner* — Quazi Farooqui
(74) *Attorney, Agent, or Firm* — DeLizio Law, PLLC

(57) ABSTRACT

One embodiment of seamless device configuration between a network device and an access point sends a device credential associated with the network device to the access point before the network device communicates with the access point. The device credential can be used to verify the identity of the network device and can authenticate the network device with the access point without requiring user interaction. Another embodiment can incorporate a central authority maintaining a database of network devices, access points and associated users. The central authority can determine when one or more network devices can seamlessly be configured for use with a particular access point. The central authority can send the device credential associated with the one or more network devices to the access point before the network device communicates with the access point.

49 Claims, 12 Drawing Sheets

(56) References Cited

U.S. PATENT DOCUMENTS

| | | | |
|---|---|---|---|
| 7,319,853 B2 | 1/2008 | Luebke et al. | |
| 7,499,548 B2 | 3/2009 | Meandzija et al. | |
| 7,616,594 B2 | 11/2009 | Roberts et al. | |
| 7,908,643 B2 | 3/2011 | Huotari et al. | |
| 8,001,584 B2 | 8/2011 | Lortz et al. | |
| 8,224,246 B2 | 7/2012 | Suumaki et al. | |
| 8,234,492 B2 | 7/2012 | Kim et al. | |
| 8,429,403 B2 | 4/2013 | Moret et al. | |
| 8,806,567 B1 | 8/2014 | Venable | |
| 9,357,385 B2 | 5/2016 | Benoit et al. | |
| 9,521,642 B2 | 12/2016 | Benoit et al. | |
| 2003/0126243 A1 | 7/2003 | Kudo et al. | |
| 2004/0098581 A1* | 5/2004 | Balfanz et al. | 713/155 |
| 2005/0010680 A1 | 1/2005 | Zick et al. | |
| 2005/0159823 A1 | 7/2005 | Hayes et al. | |
| 2005/0228874 A1 | 10/2005 | Edgett et al. | |
| 2006/0015937 A1 | 1/2006 | Illowsky et al. | |
| 2006/0053276 A1 | 3/2006 | Lortz et al. | |
| 2006/0062391 A1 | 3/2006 | Lee et al. | |
| 2006/0236105 A1* | 10/2006 | Brok | H04W 12/06 713/169 |
| 2006/0239208 A1 | 10/2006 | Roberts et al. | |
| 2007/0079362 A1 | 4/2007 | Lortz et al. | |
| 2007/0101136 A1 | 5/2007 | Lai et al. | |
| 2007/0113269 A1 | 5/2007 | Zhang | |
| 2007/0287450 A1 | 12/2007 | Yang et al. | |
| 2008/0037444 A1 | 2/2008 | Chhabra | |
| 2008/0189398 A1 | 8/2008 | Solyanik | |
| 2008/0203148 A1 | 8/2008 | Young | |
| 2008/0271131 A1 | 10/2008 | Moore | |
| 2009/0102655 A1 | 4/2009 | Yi et al. | |
| 2009/0224906 A1 | 9/2009 | Balgard et al. | |
| 2009/0300746 A1* | 12/2009 | Ahn | 726/9 |
| 2010/0260069 A1 | 10/2010 | Sakamoto et al. | |
| 2011/0044208 A1 | 2/2011 | Yun et al. | |
| 2011/0090896 A1 | 4/2011 | Bradley | |
| 2011/0191842 A1* | 8/2011 | Lindholm et al. | 726/9 |
| 2011/0197267 A1* | 8/2011 | Gravel | H04L 9/321 726/5 |
| 2011/0219427 A1 | 9/2011 | Hito et al. | |
| 2011/0265172 A1* | 10/2011 | Sharma | H04L 63/0815 726/8 |
| 2011/0271334 A1 | 11/2011 | Yang et al. | |
| 2011/0275316 A1 | 11/2011 | Suumäki et al. | |
| 2011/0277020 A1 | 11/2011 | Morita et al. | |
| 2012/0079123 A1 | 3/2012 | Brown et al. | |
| 2012/0099566 A1 | 4/2012 | Laine | |
| 2012/0100803 A1 | 4/2012 | Suumaki et al. | |
| 2012/0128157 A1* | 5/2012 | Braun | G06F 21/445 380/270 |
| 2012/0148043 A1 | 6/2012 | Tofighbakhsh | |
| 2012/0167175 A1 | 6/2012 | Choi | |
| 2012/0252405 A1 | 10/2012 | Lortz et al. | |
| 2012/0262281 A1 | 10/2012 | Edwards et al. | |
| 2012/0270505 A1 | 10/2012 | Prakash et al. | |
| 2012/0284765 A1 | 11/2012 | Killick et al. | |
| 2012/0284785 A1* | 11/2012 | Salkintzis et al. | 726/7 |
| 2012/0288092 A1 | 11/2012 | Cakulev et al. | |
| 2012/0311165 A1 | 12/2012 | Renschler et al. | |
| 2012/0324553 A1 | 12/2012 | Bernardo et al. | |
| 2012/0329429 A1 | 12/2012 | Jabara et al. | |
| 2013/0024685 A1 | 1/2013 | Kolavennu et al. | |
| 2013/0029597 A1 | 1/2013 | Liu et al. | |
| 2013/0046989 A1 | 2/2013 | Lakshminarayanan et al. | |
| 2013/0052946 A1 | 2/2013 | Chatterjee et al. | |
| 2013/0058274 A1 | 3/2013 | Scherzer et al. | |
| 2013/0068837 A1 | 3/2013 | Dollard | |
| 2013/0104202 A1* | 4/2013 | Yin | G06F 21/42 726/5 |
| 2013/0111208 A1 | 5/2013 | Sabin et al. | |
| 2013/0139233 A1 | 5/2013 | Maity | |
| 2013/0173915 A1 | 7/2013 | Haulund | |
| 2013/0179687 A1 | 7/2013 | Falk et al. | |
| 2013/0185210 A1 | 7/2013 | Dodson et al. | |
| 2013/0196647 A1* | 8/2013 | Raleigh et al. | 455/418 |
| 2013/0198816 A1 | 8/2013 | Bohli et al. | |
| 2013/0198817 A1* | 8/2013 | Haddad | H04L 63/18 726/5 |
| 2013/0221083 A1 | 8/2013 | Doss et al. | |
| 2013/0221084 A1 | 8/2013 | Doss et al. | |
| 2013/0223279 A1 | 8/2013 | Tinnakornsrisuphap et al. | |
| 2013/0227656 A1 | 8/2013 | Holtmanns et al. | |
| 2013/0239104 A1 | 9/2013 | Savant et al. | |
| 2013/0262687 A1 | 10/2013 | Avery et al. | |
| 2013/0262873 A1 | 10/2013 | Read et al. | |
| 2013/0276079 A1* | 10/2013 | Foulds et al. | 726/7 |
| 2013/0305329 A1 | 11/2013 | Zhang | |
| 2013/0309971 A1 | 11/2013 | Kiukkonen et al. | |
| 2013/0318343 A1 | 11/2013 | Bjarnason et al. | |
| 2014/0007200 A1* | 1/2014 | Zisimopoulos et al. | 726/4 |
| 2014/0019365 A1 | 1/2014 | Fallows et al. | |
| 2014/0028817 A1 | 1/2014 | Brockway, III et al. | |
| 2014/0028818 A1 | 1/2014 | Brockway, III et al. | |
| 2014/0053281 A1 | 2/2014 | Benoit et al. | |
| 2014/0068719 A1 | 3/2014 | Kiukkonen et al. | |
| 2014/0169567 A1 | 6/2014 | Wendling | |
| 2014/0226819 A1 | 8/2014 | Dittrich | |
| 2014/0245410 A1* | 8/2014 | Frelechoux | 726/6 |
| 2014/0247943 A1 | 9/2014 | Harkins | |
| 2014/0281478 A1 | 9/2014 | Huang et al. | |
| 2015/0089216 A1 | 3/2015 | Benoit et al. | |
| 2015/0244708 A1 | 8/2015 | Ballard | |
| 2015/0312089 A1 | 10/2015 | Yang et al. | |
| 2016/0242137 A1 | 8/2016 | Benoit et al. | |
| 2018/0048632 A1 | 2/2018 | Cammarota et al. | |
| 2018/0248694 A1 | 8/2018 | Benoit et al. | |

FOREIGN PATENT DOCUMENTS

| | | |
|---|---|---|
| EP | 2096505 | 9/2009 |
| JP | 2003235082 | 8/2003 |
| JP | 2004236064 | 8/2004 |
| JP | 2004264976 | 9/2004 |
| JP | 2007215120 | 8/2007 |
| JP | 2008293284 | 12/2008 |
| JP | 2010193464 | 9/2010 |
| JP | 2012104116 | 5/2012 |
| WO | 20090039548 | 4/2009 |
| WO | 20090063734 | 6/2009 |
| WO | 2010028681 | 3/2010 |
| WO | 2011141618 | 11/2011 |
| WO | 2013126731 | 8/2013 |
| WO | 2014031542 | 2/2014 |

OTHER PUBLICATIONS

"Wi-Fi Protected Setup Specification Version 1.0h", XP055031152, Internet Retrieved from the Internet: URL: http://gpl.back2roots.org/source/puma5/netgear/CG3200-1TDNDS_GPL/ap/apps/wpa2/original/Wi-Fi Protected Setup Specification 1.0h.pdf [retrieved on Jun. 26, 2012] Section 4 and subsections, Dec. 31, 2006, pp. 1-110.

"PCT Application No. PCT/US2013/055600 International Preliminary Report on Patentability", dated Dec. 3, 2014, 9 pages.

"PCT Application No. PCT/US2013/055600 Written Opinion of the IPEA", dated Aug. 25, 2014, 6 pages.

"PCT Application No. PCT/US2013/055600, International Search Report and Written Opinion", dated Dec. 20, 2013, 11 pages.

"PCT Application No. PCT/US2014/026625 Written Opinion", dated Feb. 19, 2015, 5 pages.

"U.S. Appl. No. 13/659,689 Office Action", dated Dec. 16, 2013, 29 pages.

"U.S. Appl. No. 13/659,689 Final Office Action", dated May 5, 2015, 25 pages.

"U.S. Appl. No. 13/659,689 Final Office Action", dated Jul. 21, 2014, 33 pages.

"U.S. Appl. No. 13/659,689 Office Action", dated Jan. 22, 2015, 25 pages.

Zhang, "Wi-Fi Direct based Smart Set-up (WDSS) in Lighting Systems", M.Sc. Thesis Delft University of Technology, XP055092589,, May 15, 2012, 76 pages.

(56) References Cited

OTHER PUBLICATIONS

Co-Pending U.S. Appl. No. 61/691,235, filed Aug. 20, 2012.
Co-Pending U.S. Appl. No. 13/659,689, filed Oct. 24, 2012.
Co-Pending U.S. Appl. No. 14/616,551, filed Feb. 6, 2015.
"PCT Application No. PCT/US2014/026625 International Preliminary Report on Patentability", dated Aug. 13, 2015, 16 pages.
"PCT Application No. PCT/US2014/026625 Written Opinion", dated Jul. 9, 2015, 5 pages.
"U.S. Appl. No. 13/659,689 Office Action", dated Sep. 29, 2015, 21 pages.
"Wi-Fi Certified™ for Wi-Fi Protected Setup: Easing the User Experience for Home and Small Office Wi-Fi® Networks", Internet Citation, 2007, pp. 1-16, XP002567243, Retrieved from the Internet: URL:http://www.wi-fi.org/wp/wifi-protected-setup., 2007, 16 pages.
Co-Pending U.S. Appl. No. 15/139,797, filed Apr. 27, 2016, 35 pages.
"U.S. Appl. No. 14/616,551 Office Action", dated Sep. 20, 2017, 19 pages.
"U.S. Appl. No. 15/970,395 Office Action", dated Aug. 8, 2018, 15 pages.
Menezes, et al., "Chapter 10: Identification and Entity Authentication ED", Handbook of Applied Cryptography; CRC Press Series on Discrete Mathematics and its Applications;XP001525010, Oct. 1, 1996, pp. 385-424.
Co-Pending U.S. Appl. No. 15/970,395, filed May 3, 2018.

\* cited by examiner

SEAMLESS DEVICE CONFIGURATION IN A COMMUNICATION NETWORK

BACKGROUND

Embodiments of the inventive subject matter generally relate to the field of communication systems and, more particularly, to configuring communication devices for use within a communication network.

Often, a user of a network device can be required to authenticate to an access point to gain access to network resources available through the access point. The authentication procedure can use security credentials provided by the user to control access and prevent unauthorized usage. Typical authentication steps can include entering codes or other information by the user as the network device comes within communication range of the access point. These configuration steps can seem overly complicated to some users and may discourage the use of networks and their resources altogether.

SUMMARY

Disclosed herein are various embodiments of seamless device configuration of a network device for use in a communication network. In one embodiment, the network device can be a mobile wireless device. A device credential associated with the network device is received at a terminal. An authentication recipient is identified and the device credential is sent to the authentication recipient from the terminal. The device credential is used to authenticate the network device with an access point before the network device communicates with the access point.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
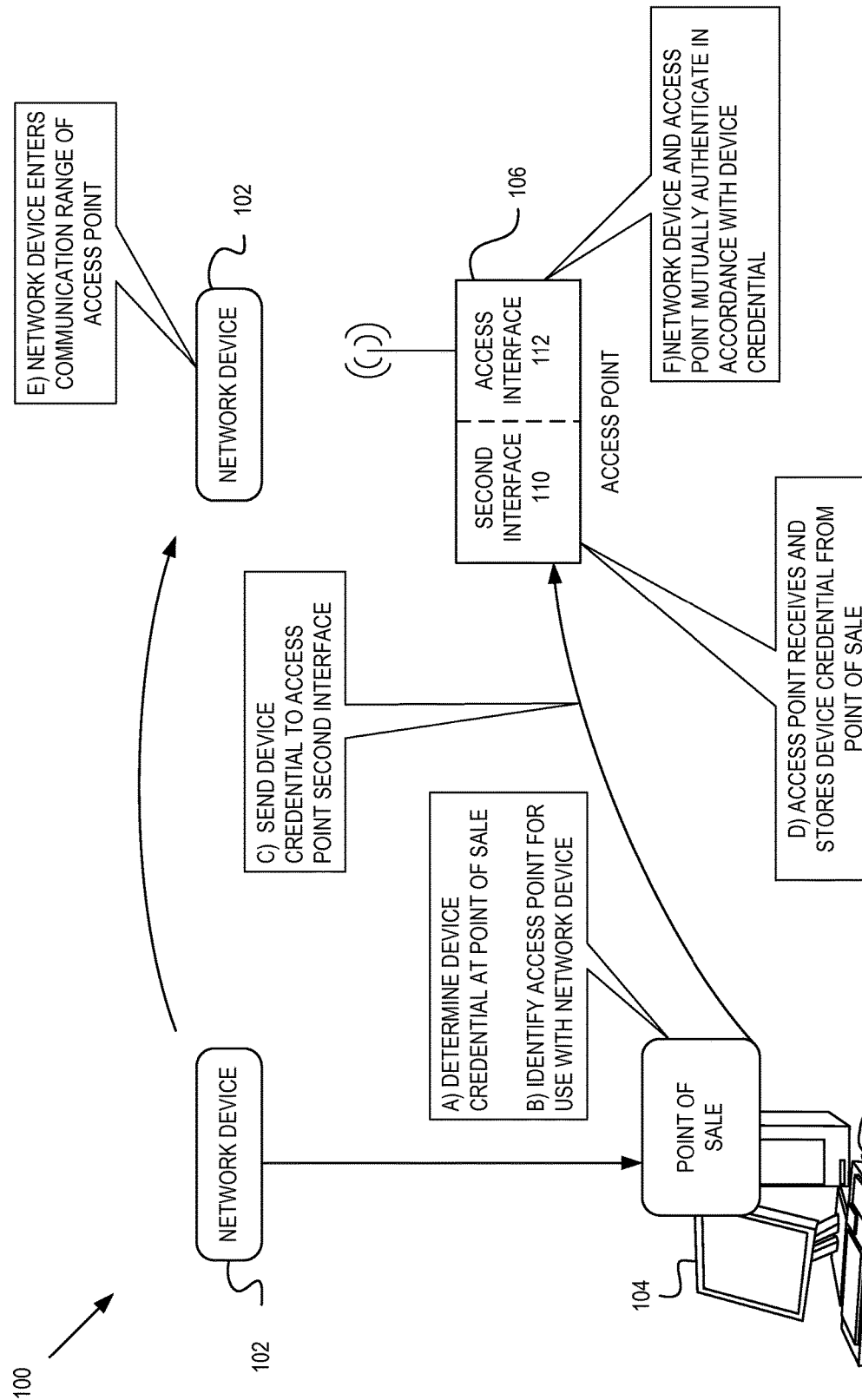
FIG. 1 is a system diagram illustrating one embodiment of a seamless device configuration method used in a communication network.

The description that follows includes exemplary systems, methods, techniques, instruction sequences and computer program products that embody techniques of the present inventive subject matter. However, it is understood that the described embodiments may be practiced without these specific details. For instance, although examples refer to wireless networks, other types of networks are contemplated such as wire-based networks such as coaxial cable, twisted pair, power line or other technically feasible networks. In other instances, well-known instruction instances, protocols, structures and techniques have not been shown in detail in order not to obfuscate the description.

Often, participation in a communication network by a network device through an access point is controlled so that access to network resources available through the access point is also controlled. Controlled access can prevent unintended or unauthorized access. Traditional access control methods allow a user device and network device to "authenticate" with an access point. Authentication allows the user to verify that a particular device is authorized to access a network. Typical authentication steps include entering codes or other credentials by the user as the network device comes within communication range of the access point. These configuration steps can seem overly complicated and time consuming to some users and may discourage the use of networks and their resources altogether.

Seamless device configuration can reduce or eliminate any required user interaction and simplify user access while maintaining a controlled access environment. One embodiment of a method for seamless configuration of network devices for use with a communication network can authenticate a network device with an access point prior to the network device being connected to the access point. Authentication can enable the network device to access resources connected to networks accessible through the access point such as data storage, printers, cloud-based resources, internet access, etc. A device credential associated with the network device can be stored within the access point before the network device is within communication range of the access point. The access point can also store device credentials associated with other network devices. The access point can use the device credential to authenticate the network device without sharing (transmitting) the device credential. For example, the access point can proves its possession of the device credential to the network device using operations based on, at least in part, Diffie-Hellman, Simultaneous Authentication of Equals (SAE), Wi-Fi Protected Setup (WPS) or any other technically feasible authentication protocol based on the device credential. If the access point does not authenticate the network device, then the access point can refuse network access for the network device. In this manner, permission to gain access to the access point can be transparent to the user, without the user having to enter codes or passwords.

The device credential can be entered and stored into the access point directly through a communication interface at the access point, or the device credential can be entered indirectly through a trusted device, such as a smart phone. That is, for indirect entry, the device credential can first be sent to a trusted device, other than the access point. The trusted device can forward the device credential to the access point. In one embodiment, the trusted device can forward the device credential after access is approved by the user or a third party.

In another embodiment, instead of a device credential, a one-time password can be assigned to the network device. The one-time password can be stored directly or indirectly in the access point as described above. The access point can authenticate the network device using the one-time password. For example, the access point can prove its possession of the device credential to the network device using operations based on, at least in part, Diffie-Hellman, Simultaneous Authentication of Equals (SAE), Wi-Fi Protected Setup (WPS) or any other technically feasible authentication protocol based on the device credential. The one-time password can be more secure than the device credential because the one-time password can be generated, assigned and transmitted through secure channels, making it more difficult to clone or spoof.

In yet another embodiment, a Central Authority can track the association of network devices, access points and users. For example, when the user purchases an access point, an access point device identifier can be associated with a user (such as through a user ID). The association can be stored in a database by the Central Authority. When a network device is purchased by the user, a network device credential associated with the network device can be associated with the user and again stored by the Central Authority in the database. The Central Authority can determine when a network device can be seamlessly authenticated with an access point by matching user IDs associated with the network devices with user IDs associated with access points. The Central Authority can send the network device credential to be stored in the access point. When the network device seeks to connect to the access point, the access point and network device can mutually authenticate using the device credential. For example, the access point can prove its possession of the device credential to the network device using operations based on, at least in part, Diffie-Hellman, Simultaneous Authentication of Equals (SAE), Wi-Fi Protected Setup (WPS) or any other technically feasible authentication protocol based on the device credential.

FIG. 1 is a system diagram 100 illustrating one embodiment of a seamless device configuration method used in a communication network. In an overview of the system diagram 100 shown in FIG. 1, a device credential can be associated with network device 102. The device credential can be stored within network device 102 and can also be transmitted directly to a network gateway such as access point 106. When network device 102 seeks to access a communication network served by access point 106, access point 106 can authenticate network device 102 when network device 102 proves its possession of the device credential to access point 106.

Network device 102 can be a network device and can take the form of any technically feasible device that can transfer data through a communication network. Exemplary network devices 102 can be smart phones, laptops, netbooks, tablet computers, smart thermostats, smart home appliances (furnaces, stereos, network capable televisions, etc.) and the like. For example, network devices 102 can be devices with wireless interfaces such as interfaces that conform to ZigBee®, IEEE 802.11 standards or Bluetooth® enabled devices. In other embodiments, network device 102 can take the form of a wired device such as one that communicates over Ethernet or a device that includes an interface that can conform with a powerline communications protocol such as those described by the HomePlug Alliance®.

At stage A, a device credential of network device 102 can be determined. In one embodiment, the device credential can be determined when the network device is sold. Examples of device credentials can be a serial number or a personal identification number (PIN) code or any technically feasible code or string that can be used to identify network device 102. For example, when network device 102 is sold at a terminal, such as a point of sale terminal 104, the device credential can be read from packaging surrounding network device 102. In one embodiment, the device credential can be assigned to network device 102 when the device is manufactured. In another embodiment, the device credential can be encoded and printed as a quick response (QR) code, barcode or other machine readable code (not shown) on the packaging of network device 102. For example, the device credential can be determined by simply reading the QR code with a camera, smart phone, scanner or other QR code reader. Using a machine readable code, such as a QR code, can help to determine the device credential relatively quickly and can reduce human error associated with obtaining or reading the device credential. In yet another embodiment, a near field communication (NFC) tag (not shown) containing the device credential can be provided by the manufacture and attached to, or located proximate to network device 102. The NFC tag can be read by a NFC tag reader to determine the device credential. Using the NFC tag can also reduce errors in determining device credentials of network device 102.

At stage B, access point 106 can be identified by the user or purchaser of network device 102. Access point 106 can function as a gateway or entry point for a network. By identifying access point 106, the user or purchaser can indicate that he/she desires network device 102 to access a network and/or network resources through access point 106. Access point 106 can include access interface 112. Access interface 112 can provide a communication interface to network device 102. Access interface 112 can be implemented a wireless interface such as a WiFi interface conforming to IEEE 802.11 specifications, ZigBee, WiMAX, Bluetooth and others. In another embodiment, access interface 112 can be any technically feasible wired interface such as Ethernet, power line communications (PLC) such as those specified by the HomePlug Alliance and others.

Access point 106 can also include second interface 110. In some embodiments, second interface 110 can provide an independent communication interface to access point 106. For example, second interface 110 can be implemented with a cellular radio or modem. In this manner, access point 106 can be identified with a phone number and can receive SMS (short message service) messages. In other embodiments, second interface 110 can be provided with other interfaces such as a wired connection to other networks, such as a cloud network, or other network related resources such as Internet based networks.

In some embodiments, access point 106 can support a short message service (SMS) client through an Internet connection. The SMS client can be associated with a phone number and can receive SMS messages without the need for a cellular radio. Thus, access point 106 can again be identified with a phone number, even when access point 106 does not include a cellular radio. In still other embodiments, access point 106 can be identified with an email address.

At stage C, the device credential (as described in stage A) is sent to access point 106. For example, the device credential can be sent by a seller or retailer involved at point of sale terminal 104 when network device 102 is purchased and the access point 106 is identified. In one embodiment, the device credential can be sent via a SMS message addressed to the phone number associated with access point 106. The SMS message can be received by second interface 110 of access point 106, particularly when second interface 110 includes a cellular modem or interface. In other embodiments, the SMS message can be sent to a SMS client associated with access point 106, such as a SMS client running on a processor included in access point 106.

As described above, the device credential can be sent at a time of sale of network device 102. For example, the sale can be provided by a seller operating a "brick and mortar" type of retail store. In another embodiment, the sale of network device 102 can by through an online seller. In both cases, the seller can send the device credential to an identified access point 106 through an SMS message.

In one embodiment, second interface 110 of access point 106 can be identified with a descriptor device. The descriptor device can ease the task of identifying access point 106 for the user by providing a user friendly tool for providing the phone number associated with access point 106 to a registrar so that the device credential can be sent to access point 106. One example of a descriptor device can be a card with a magnetic stripe that can be provided to the user/owner of access point 106 (when access point 106 is purchased or deployed) and can include the phone number associated with access point 106. In this manner, access point 106 can be identified by reading the magnetic stripe on the card. The magnetic stripe card can reduce errors that may be associated with identifying access point 106. In another embodiment, an NFC device including the phone number associated with access point 106 can be provided to the user/owner of access point 106. The provided NFC device can be used to provide the phone number to identify access point 106. Descriptor devices can simplify stage B related processes by providing a simpler and more error free method for determining the phone number associated with access point 106.

At stage D, access point 106 can receive the device credential and store the device credential within access point 106. The device credential can be received through second interface 110 or access interface 112. In one embodiment, the recipient of the device credential can be referred to as an authentication recipient. For example, if the device credential is sent as an SMS message, then access point 106 can receive the SMS message through second interface 110 when second interface includes a cellular radio or modem. In another example, a SMS message can be received through second interface 110 when a SMS client is provided within second interface 110. The device credential can be stored in memory within access point 106 such as random access memory (RAM), flash RAM, EEPROM, or any other persistent or semi-persistent storage device.

In one embodiment, before accepting the contents of the SMS message, the source of the SMS message can optionally be verified. For example, if the SMS message is received from a trustworthy source, such as a known retailer, then access point 106 can accept the contents of the SMS message. Known retailers can be determined by comparing the sending SMS phone numbers against a list of verified retailers. The source of the SMS message can be determined by reviewing the sending phone number associated with the SMS message. Verifying the sender of the SMS message can help prevent false or spoofed messages from being accepted by access point 106.

In some embodiments, access point 106 can send a validation phrase back to the sender of the SMS message. The validation phrase can include a phrase or numbers to acknowledge successful receipt of the SMS message including the device credential information. The validation phrase can be used to help determine when the SMS message including the network device credential has been sent to an incorrect phone number. For example, when the user identifies access point 106 with a phone number associated with access point 106, a SMS message can be sent to access point 106. If the validation phrase returned from access point 106 is not a phrase that is expected, then the purchase can determine that the device credential may have sent to an incorrect phone number. The sender of the SMS message can take appropriate steps to correct the issue.

At stage E, network device 102 can enter communication range of access point 106. For example, if network device 102 is a wireless device, network device 102 can be moved to a position such that radio signals can be transmitted and received between network device 102 and access point 106. Alternatively, if network device 102 is a wired device, then network device 102 can be within communication range when network device 102 is coupled to access point 106 through a wire, powerline or cable.

At stage F, network device 102 and access point 106 can mutually authenticate using device credential. For example, network device 102 can prove its possession of the device credential to access point 106 (using device credentials stored within access point 106). Device credentials can be received and stored in access point 106 as described in stage D above. Proof of possession of the device credential can be based on, at least in part, Diffie-Hellman, Simultaneous Authentication of Equals (SAE), Wi-Fi Protected Setup (WPS) or any other technically feasible authentication protocol based on the device credential.

If possession of the device credential is verified (proven), then network device 102 can be authenticated with access point 106. When network device 102 is authenticated, network device 102 can access networks coupled directly or indirectly to access point 106. In one embodiment, network device 102 can communicate with access point 106 through access interface 112 while second interface 110 can access and communicate directly or indirectly with other networks.

FIG. 1 can be referred to as a direct method since the device credential is provided directly to access point 106. The direct method can be straightforward and require little, if any, user interaction. An indirect method can offer an increased level of security by sending the device credential to a trusted device for verification prior to forwarding to access point 106. The indirect method is described below in conjunction with FIG. 2.

Figure 2A:
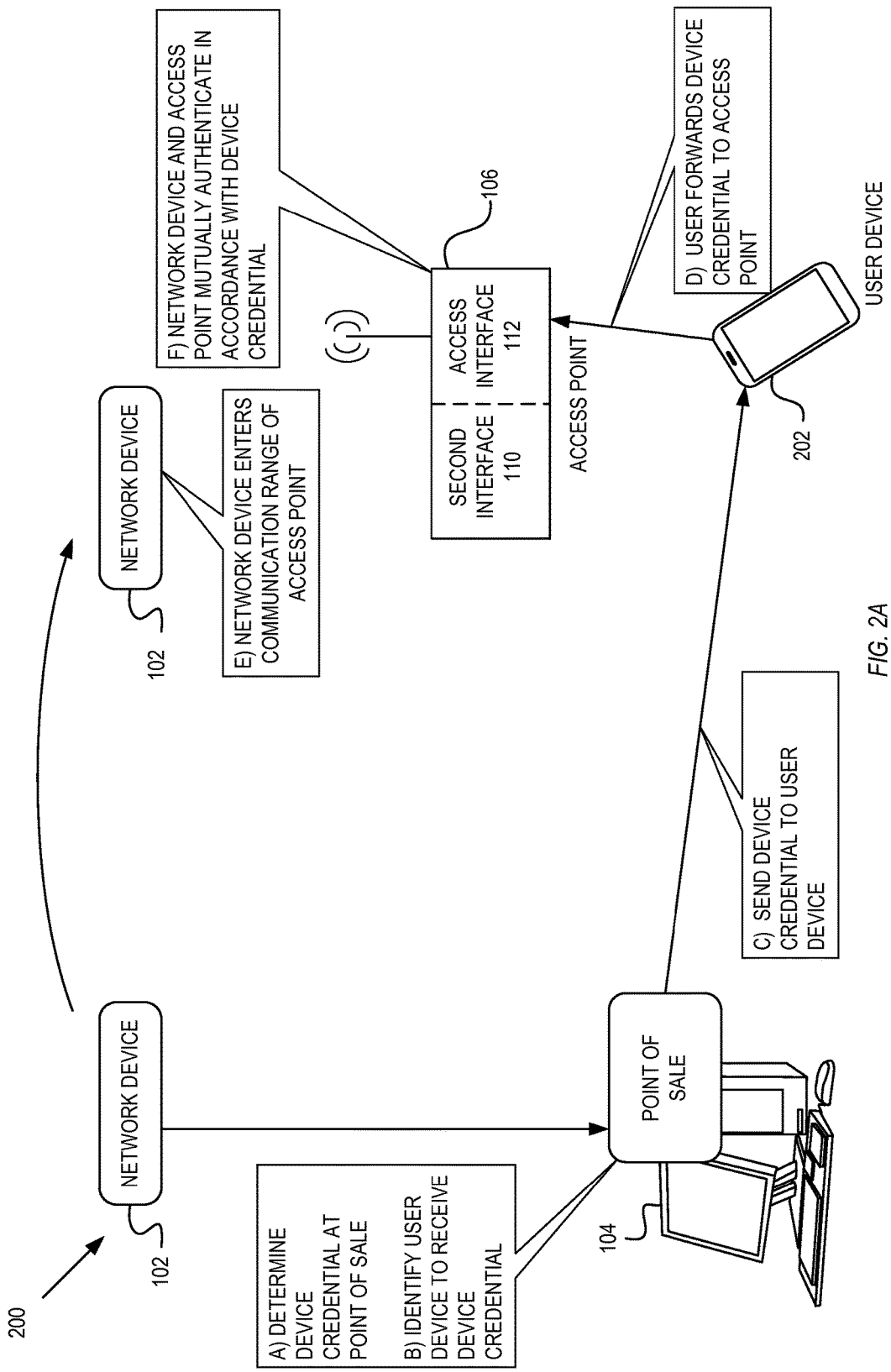
FIGS. 2A-2B are system diagrams illustrating embodiments of a seamless device configuration method used in a communication network.
Figure 2B:
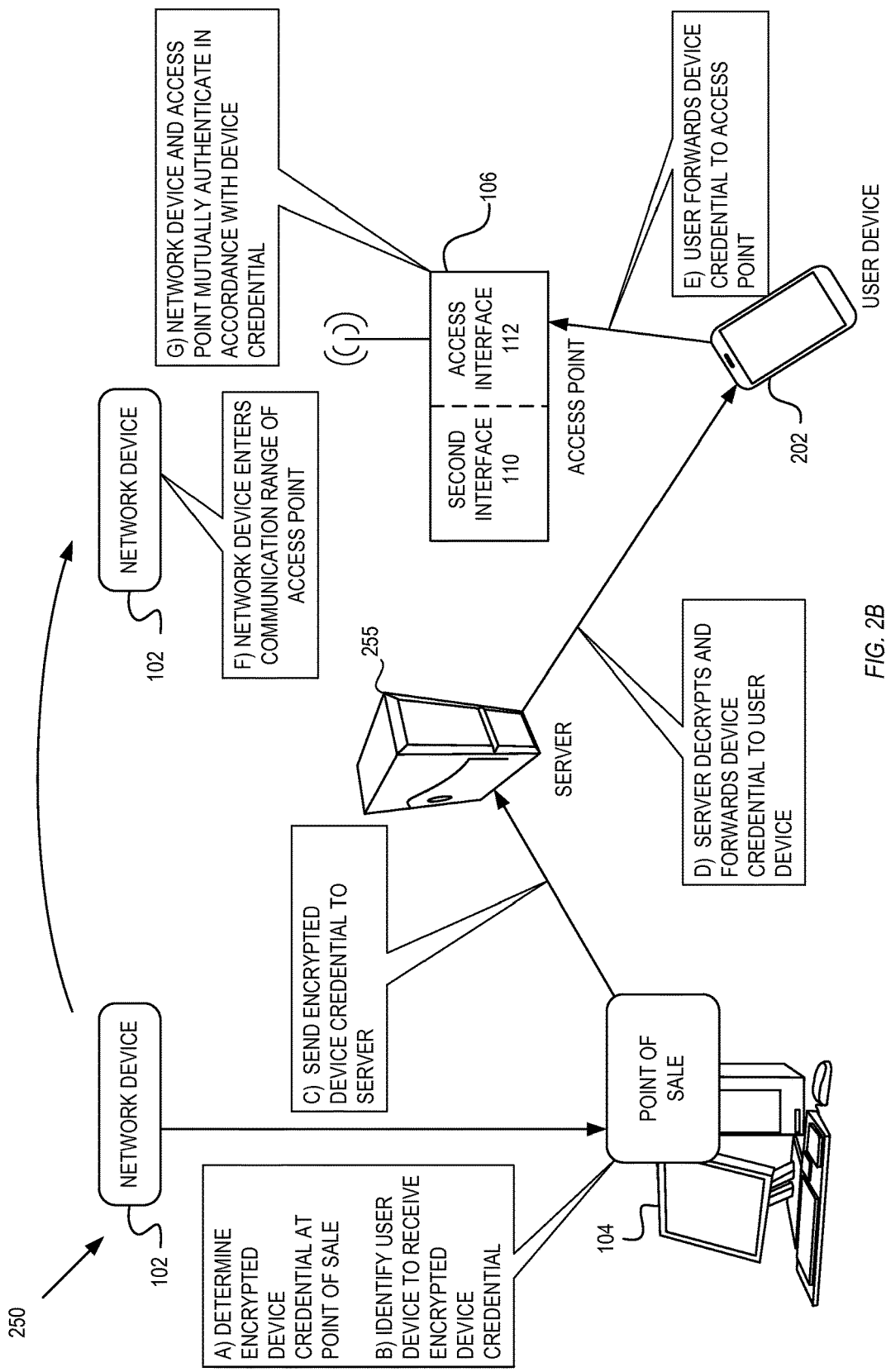

FIGS. 2A and 2B are system diagrams 200 and 250 illustrating embodiments of a seamless device configuration method used in a communication network. System diagram 200 shows a system without encrypted device credentials. System diagram 250 differs slightly from system diagram 200 since system diagram 250 includes encrypted device credentials.

Beginning with System diagram 200 in FIG. 2A, at stage A, the device credential associated with network device 102 is determined. This is similar to stage A as described in FIG. 1 above. At stage B, user device 202 can be identified for receiving the device credential. User device 202 can be a trusted device such as a smart phone, tablet computer or any other technically feasible device that can receive the device credential and can communicate with access point 106 as described below in conjunction with stages C and D. User device 202 can be referred to as an authentication recipient because device credentials can be received thereby. In one embodiment, user device 202 can be identified with a phone number. For example, user device 202 can include a cellular phone or modem or can include a SMS client running on a processor included in user device 202 that can be configured to respond to a phone number. In another embodiment, user device 202 can be identified with an email address. Descriptor devices as described in conjunction with stage A of FIG. 1 can also be used to identify user device 202.

At stage C, the device credential determined in stage A can be sent to user device 202. As described above in FIG.

1, the device credential can be sent by a seller or retailer involved at point of sale terminal 104 when network device 102 is purchased. The device credential can be sent via a SMS message addressed to the phone number associated with user device 202 (particularly when user device 202 can be identified with a phone number). In another embodiment, the device credential can be sent through an email message, Uniform Resource Locator (URL), social media notification messages, operating system notification messages, or any other technically feasible messaging protocol to user device 202.

At stage D, the device credential can be forwarded to access point 106 from user device 202. In one embodiment, the forwarding is not automatic, but rather can involve user interaction to review the device credential at user device 202 and actively forward the device credential to access point 106. The user receiving the device credential at user device 202 needs not be the owner or user of network device 102, but instead can be an owner, user or administrator of access point 106. Actions at user device 202 (the forwarding of the device credential) can configure access point 106 to authorize the user of network device 102 to have access to access point 106 as well as networks directly or indirectly coupled to access point 106. Since the device credential is sent indirectly to access point 106 through user device 202, an extra layer of security can be realized by requiring an active action on the part of a third party to actively forward the device credential to access point 106.

In one embodiment, user device 202 can forward the device credential to access point 106 through access interface 112. For example, if access interface 112 is a WiFi interface, and user device 202 also includes a WiFi interface and has previously authenticated with access point 106, then user device 202 can forward the device credential to access point 106 through access interface 112. In another embodiment, both user device 202 and access point 106 can include a cellular radio or modem (i.e., second interface 110 can include the cellular radio or modem) that can be used to forward and receive the device credential. For example, user device 202 can forward the device credential via a SMS message that can be received through second interface 110 of access point 106.

At stage E, network device 102 can enter communication range of access point 106. At stage F, network device 102 and access point 106 can mutually authenticate using device credential. In some implementations, stages E and F can be similar to the like named stages described in FIG. 1 above.

Turning to system diagram 250 in FIG. 2B, at stage A, the encrypted device credential associated with network device 102 is determined. This can be similar to stage A as described in FIG. 1. However, in this embodiment, the device credential can be encrypted. Encrypting the device credential can add a level of security by obfuscating the device credential, particularly when the device credential is available on packaging surrounding network device 102 or can be read from barcode or QR code. In one embodiment, the device credential can be encrypted with asymmetric encryption such as an encryption method that uses public and private encryption keys. In another embodiment, the device credential can be encrypted with symmetric encryption method using a shared encryption key.

At stage B, user device 202 can be identified for receiving the device credential. In one embodiment, user device 202 can be identified with a phone number. In another embodiment, user device 202 can be identified with an email address. At stage C, the encrypted device credential and a user device 202 identifier (determined in stage B) can be sent to server 255. In one embodiment, server 255 can verify a sender identity of the encrypted device credential to help prevent from using server 255 from unauthorized or malicious use. For example, server 255 can verify that the encrypted device credential was sent by a known point of sale terminal 104 or an associated trusted server. At stage D, server 255 can decrypt the encrypted device credential and then send the decrypted device credential to user device 202. Server 255 can decrypt the device credential with an appropriate decryption method (symmetric or asymmetric, determined, at least in part, by a selected encryption method). In one embodiment, server 255 can send the decrypted device credential to a phone number used to identify user device 202 in stage B. In another embodiment, the decrypted device credential can be sent through an email message, Uniform Resource Locator (URL), social media notification messages, operating system notification messages, or any other technically feasible messaging protocol to user device 202. At stage E, the decrypted device credential can be forwarded to access point 106 from user device 202. Actions at user device 202 (the forwarding of the device credential) can configure access point 106 to authorize the user of network device 102 to have access to access point 106 as well as networks directly or indirectly coupled to access point 106. As described above, user device 202 can forward the decrypted device credential through access.

At stage F, network device 102 can enter communication range of access point 106. At stage G, network device 102 can authenticate with access point 106 using device credentials stored within access point 106. In one embodiment, this can be similar to stage F as described above in FIG. 1. In one embodiment, network device 102 can communicate with access point 106 through access interface 112 while second interface 110 can access and communicate directly or indirectly with other networks.

Figure 3A:
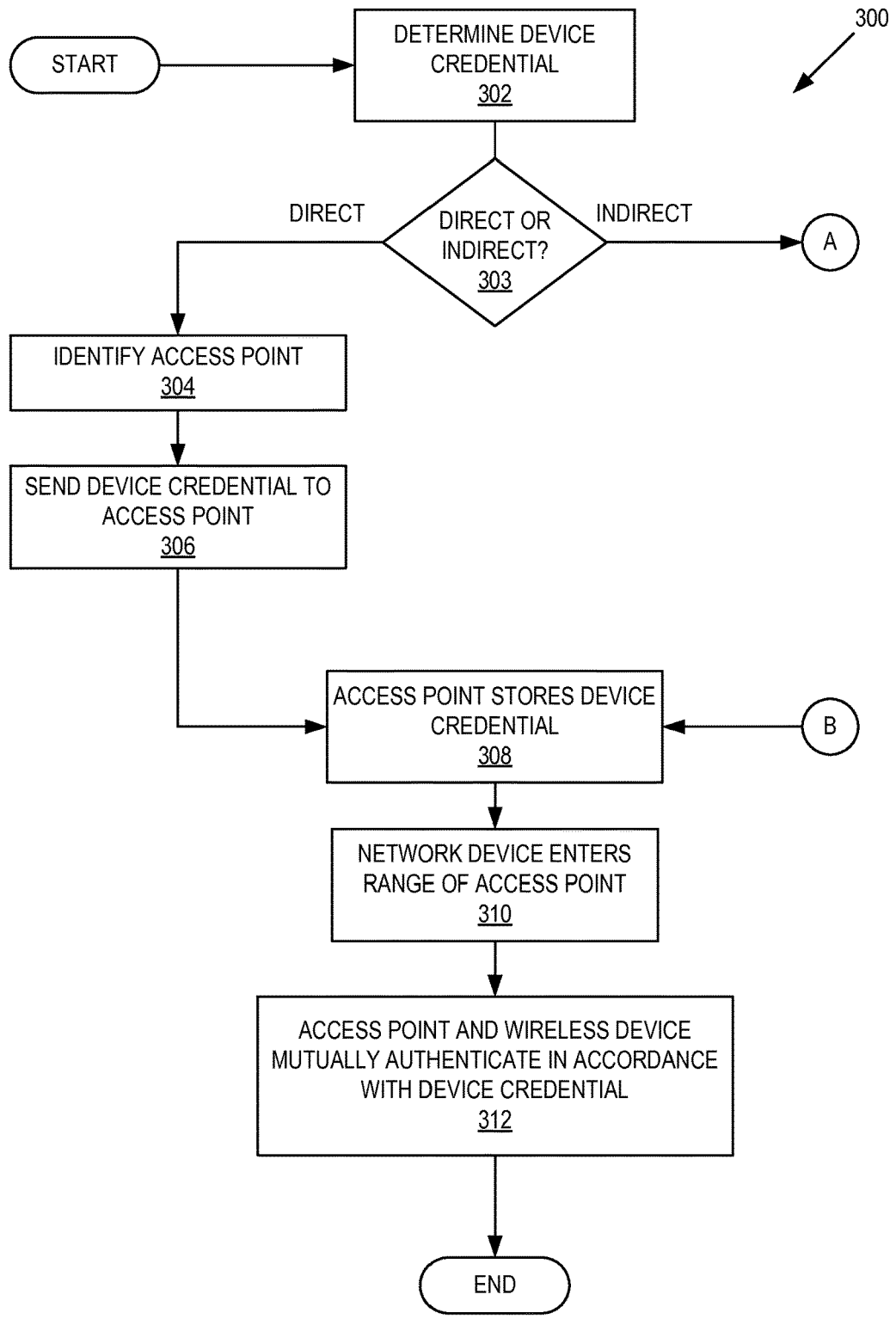
FIG. 3A-3B show flow diagrams illustrating exemplary operations for seamless device configuration in a communication network.
Figure 3B:
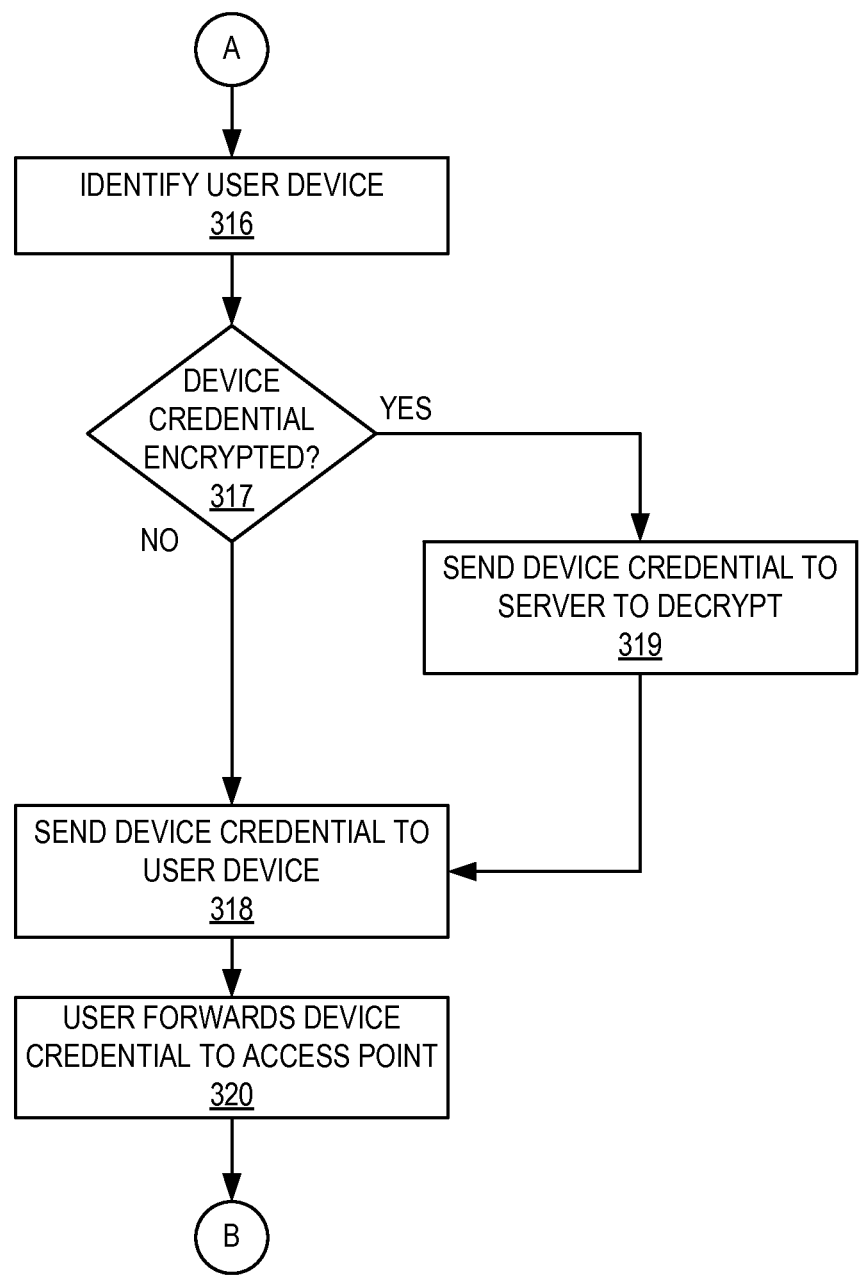

FIGS. 3A and 3B show flow diagram 300 illustrating exemplary operations for seamless device configuration in a communication network. The method of FIG. 3 is described with reference to the systems and components described in FIGS. 1 and 2 (for illustration purposes and not as a limitation). The example operations can be carried out by one or more components in system 100 or 200, such as terminal 104, a processor within network device 102, access point 106 or by user device 202. Beginning with block 302, the device credential associated with network device 102 can be determined. As described above, the device credential can be a serial number, PIN code or any technically feasible code or string that can identify network device 102. In some embodiments, the device credential can be a machine readable code such as a QR code, bar code or NFC tag that can be scanned to retrieve the device credential.

Proceeding to block 303, if the device credential is sent directly to access point 106, then the flow proceeds to block 304 where access point 106 is identified. As described above, access point 106 can be identified with a phone number, email address or any other technically feasible means. The flow can proceed to block 306 where the determined device credential is sent to the identified access point 106. In one embodiment, the device credential is sent via a SMS message to access point 106. Access point 106 can include a cellular radio or modem that can be configured to receive SMS messages or access point 106 can include a SMS client running on a processor that can receive SMS messages. In another embodiment, access point 106 can receive the device credential through an email message.

Proceeding to block 308, the device credential is stored in access point 106. Access point 106 can include memory such as RAM, flash RAM, EEPROM, or any other persistent or semi-persistent storage device that can be used to store the received device credential. Proceeding to block 310, network device 102 can enter communication range of access point 106. If network device 102 and access point 106 both include wireless interfaces, then when network device 102 can be moved to a position such that radio signals can be transmitted and received between network device 102 and access point 106. In another embodiment, if network device 102 and access point 106 both include a wire-based interface such as cable-based Ethernet or PLC, then network device 102 can be within communication range of access point 106 when a wire-based connection is established between them.

Proceeding to block 312, access point 106 and network device 102 can mutually authenticate using the device credential. In some embodiments, network device 102 can prove its possession of the device credential to access point 106 and the flow ends.

Returning to block 303, if the device credential is sent indirectly to access point 106, then the flow proceeds to block 316 of FIG. 3B where user device 202 can be identified. In one embodiment, user device 202 can be identified with a phone number, particularly when user device 202 is a smart phone. In another embodiment, user device 202 is identified with an email address. User device 202 can be any technically feasible device that can receive messages and can communicate with access point 106 such as a laptop, tablet computer or similar device. Proceeding to block 317, if the device credential is not encrypted, then flow proceeds to block 318 where the device credential can be sent to the identified user device 202. In one embodiment, the device credential can be sent via a SMS message. In another embodiment, the device credential can be sent through an email message.

Proceeding to block 320, a user, administrator or owner associated with access point 106 can forward the device credential from user device 202 to access point 106 and the flow can proceed to block 308 as described above.

Returning to block 317, if the device credential is encrypted, then flow proceeds to block 319. In block 319, server 255 can decrypt the encrypted device credential. Decryption can be asymmetric or symmetric decryption based, in part, on the encryption used when the device credential was formed as was described in stage A of FIG. 3B. After the device credential is decrypted, the flow can proceed to block 318.

Although block 303 is shown in flow diagram 300, in some implementations the operations described in conjunction with block 303 can be omitted. For example in a first embodiment, operations according to blocks 302, 304, 306, 308, and 310 can be performed while in a second embodiment, operations according to blocks 302, 316, 317, 319, 318, 320, 308, and 310 can be performed. In both the first and second embodiments described above, decision block 303 would not actively be performed.

Figure 4:
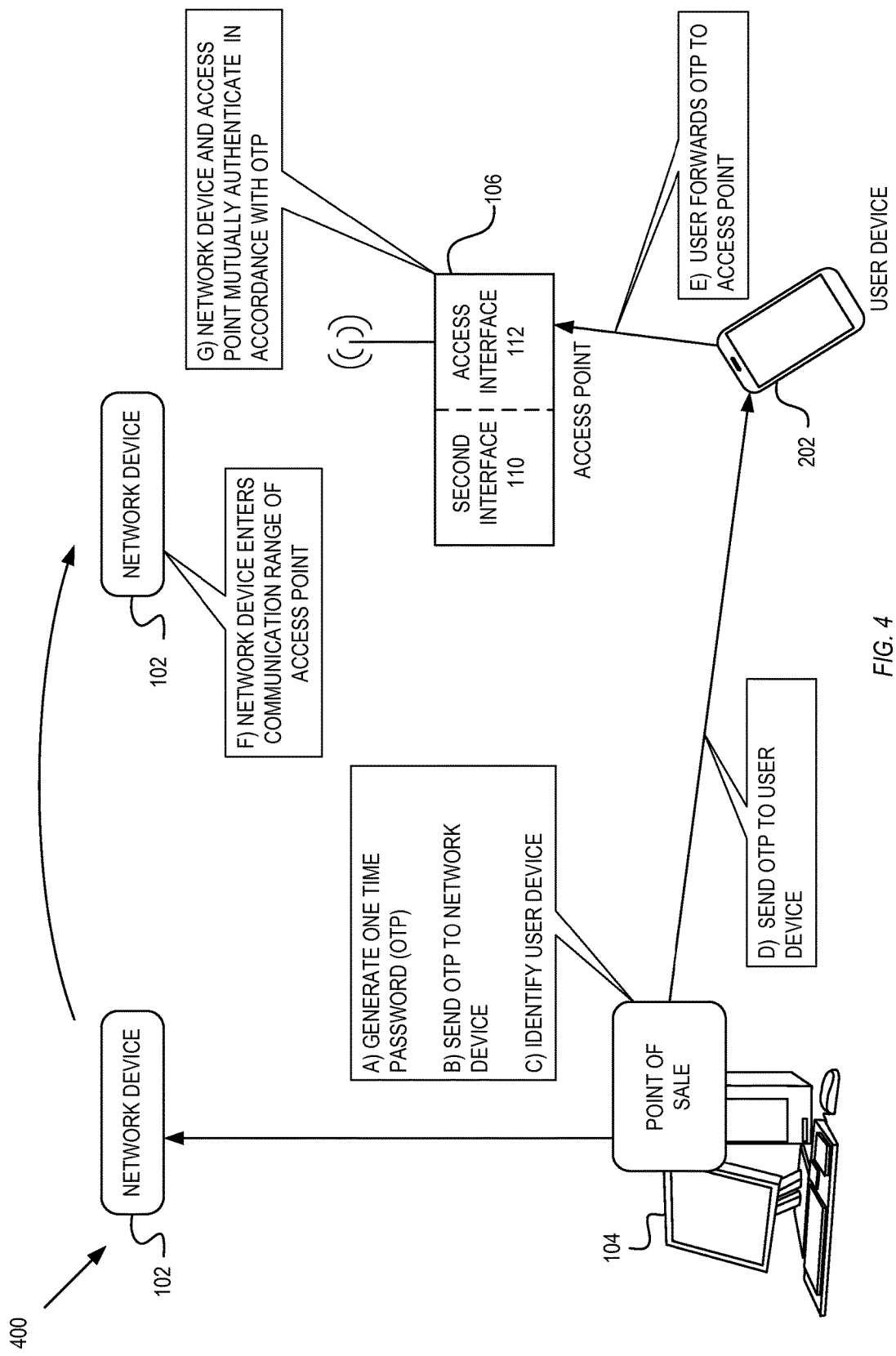
FIG. 4 is a system diagram illustrating yet another embodiment of a seamless device configuration method used in a communication network.

FIG. 4 is a system diagram 400 illustrating yet another embodiment of a seamless device configuration method used in a communication network. In an overview of system diagram 400, a one-time password can be generated and provided to network device 102 and to access point 106 replacing the use of the device credential described in FIGS. 1 and 2. Using a one-time password can be more secure than the device credential because the one-time password can be generated, assigned and transmitted through secure channels to the network device 102 and access point 106 making it relatively more difficult to clone or spoof.

At stage A, a one-time password can be generated. The one-time password can include letters, numbers or symbols and can be of a predetermined or variable length. In one embodiment, the one-time password can be generated by the point of sale terminal 104. In another embodiment, the one-time password can be generated by the purchaser or user of network device 102. For example, the purchaser or user can have an application that can run on a smart phone, tablet computer or other technically feasible device that can generate the one-time password. In one embodiment, the one-time password can be displayed as a barcode by a smart phone application.

At stage B, the one-time password is stored in network device 102. In one embodiment, network device 102 can be connected to an activation platform to receive the one-time password. For example, the connection between network device 102 and the activation platform can be a cable, such as a USB cable or the connection can be a secure (encrypted) link. By using a secure (encrypted) connection, the integrity and security of the one-time password is enhanced. In other embodiments, the one-time password can be sent to network device 102 through a Secure Digital (SD) card, or using NFC protocols and devices. The one-time password can be stored in a memory included in network device 102. The memory can be RAM, flash RAM, EEPROM, or any other persistent or semi-persistent storage device.

At stage C, user device 202 can be identified. User device 202 can be used to indirectly send the one-time password to access point 106 in a similar manner as described above in conjunction with FIG. 2. User device 202 can include a cellular phone or modem or can include a SMS client running on a processor that can be identified with a phone number. In another embodiment, user device 202 can be identified with an email address. Device descriptors as described in conjunction with FIG. 1 can also be used to identify user device 202.

At stage D, the one-time password can be sent to user device 202. As illustrated in FIG. 4, in one embodiment point of sale terminal 104 can generate and send the one-time password to user device 202. In another embodiment, if the one-time password is generated by an application running on a device such as a smart phone or tablet computer, then the one-time password can be sent from the device (smart phone, tablet computer, etc.) directly to the user device 202.

At stage E the one-time password can be forwarded to and stored within access point 106 from user device 202. This can be similar to stage D described above in conjunction with FIG. 2. User device 202 can forward one-time password to access point 106 through access interface 112. For example, if access interface 112 is a WiFi interface, and user device 202 also includes a WiFi interface and has previously authenticated with access point 106, then user device 202 can forward the one-time password to access point 106 through access interface 112. Alternatively, if both user device 202 and access point 106 includes a cellular radio or modem included in second interface 110, then user device 202 can forward the one-time password to access point 106 through an SMS message.

Similar to stage D described in conjunction with FIG. 2, forwarding of the one-time password is not automatic, but rather involves user interaction to review the one-time password at user device 202 and actively forward the one-time password to access point 106. The user receiving the one-time password at user device 202 need not be the owner or user of network device 102, but instead can be an owner, user or administrator of access point 106. Actions at user device 202 can be seen as actions to authorize the user of network device 102 to have access to access point 106 as well as networks directly or indirectly coupled to access point 106. Since the one-time password is sent indirectly to access point 106 through user device 202, an extra layer of security can be realized by requiring an active action on the part of a third party to actively forward the one-time password to access point 106.

At stage F, network device 102 can enter communication range of access point 106. This stage can be similar to as described for stage E in FIG. 1 or 2 above. At stage G, network device 102 and access point 106 can mutually authenticate. For example, network device can authenticate with access point 106 when network device 102 proves its possession of the one-time password to access point 106. This stage can be similar to as described for stage F in FIG. 1 or 2 above.

Figure 5:
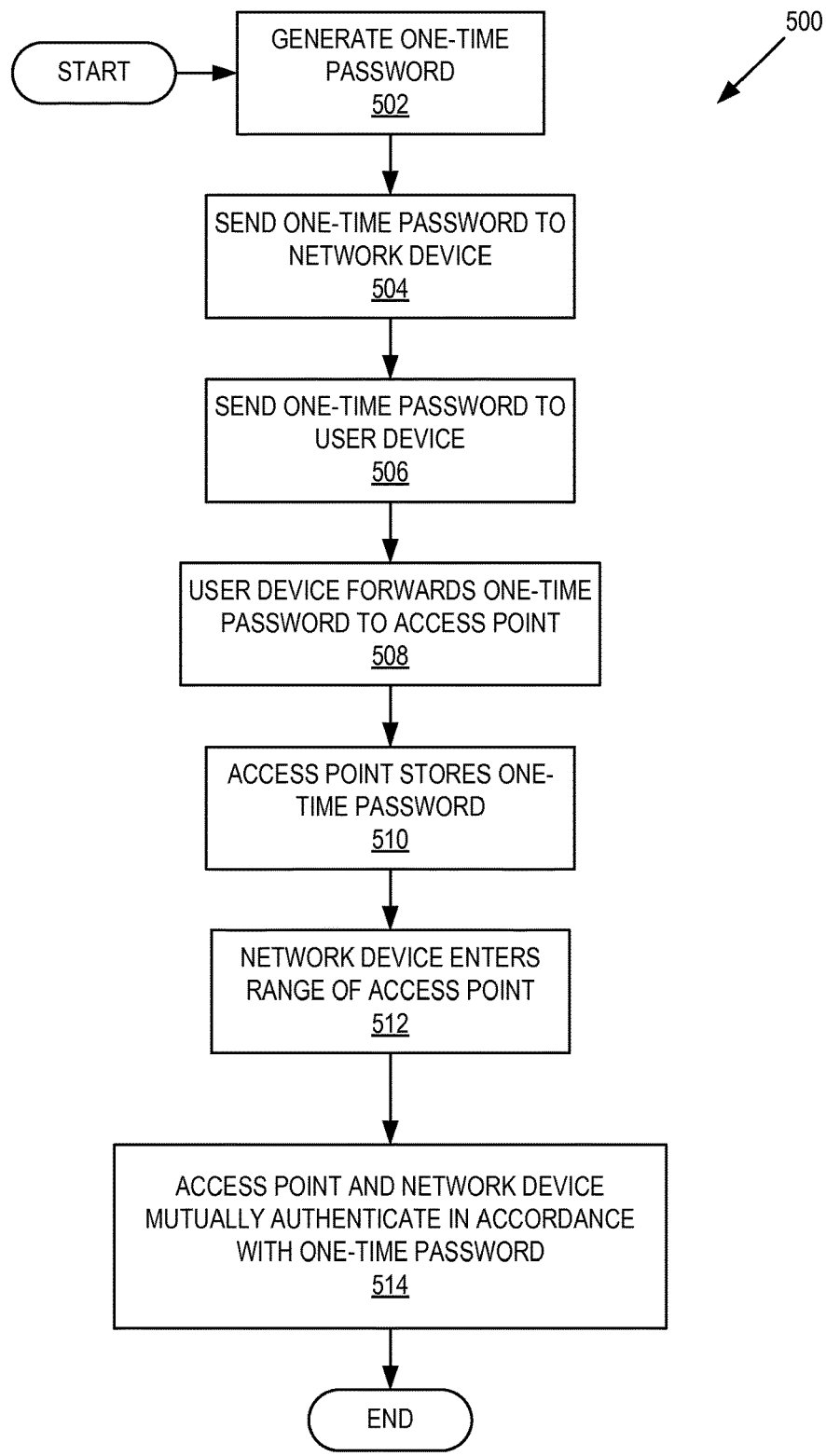
FIG. 5 is a flow diagram illustrating another embodiment of example operations for seamless device configuration in a communication network.

FIG. 5 is a flow diagram 500 illustrating another embodiment of example operations for seamless device configuration in a communication network. The method of FIG. 5 is described with reference to the systems and components described in FIG. 4 (for illustration purposes and not as a limitation). The example operations can be carried out by one or more components in system 400 such as terminal 104, a processor within network device 102 or access point 106 or by user device 202.

Beginning in block 502, the one-time password can be generated. In one embodiment, the one-time password can be generated by a user through an application running on a smart phone or other technically feasible device. In another embodiment, the one-time password can be generated on a terminal involved during the sale of network device 102, such as point of sale terminal 104. Proceeding to block 504, the one-time password can be sent to and stored in network device 102. In one embodiment, the one-time password is sent through a secure connection to network device 102. In another embodiment, the one-time password is sent to network device 102 through a SD card or NFC device. The one-time password can be stored in a memory included in network device 102. The memory can be RAM, flash RAM, EEPROM, or any other persistent or semi-persistent storage device.

Proceeding to block 506, the one-time password can be sent to user device 202. As described above, user device 202 can be a smart phone, tablet computer or any other technically feasible device. Proceeding to block 508, the one-time password can be forwarded from user device 202 to access point 106. This step can enable a confirmation of the access for network device 102. In block 510, access point 106 can receive and store one-time password within access point 106. For example, one-time password can be stored in a memory included within access point 106. Proceeding to block 512, network device can enter communication range of access point 106. Finally, in block 514, network device 102 and access point 106 can mutually authenticate using one-time password stored within access point 106 and the flow ends. In one embodiment, this can be similar to stage F as described above in FIG. 1.

The embodiments shown in FIGS. 4 and 5 describe an indirect storing of the one-time password into access point 106 similar to the indirect methods shown and described in FIGS. 2 and 3. In another embodiment, the one-time password can be directly stored into access point 106 by simply sending the one-time password directly to access point 106 instead of going through the intermediate device of user device 202. For example, after the one-time password is generated, in block 506, the one-time password can be sent directly to access point 106 and block 508 can be omitted altogether.

Figure 6A:
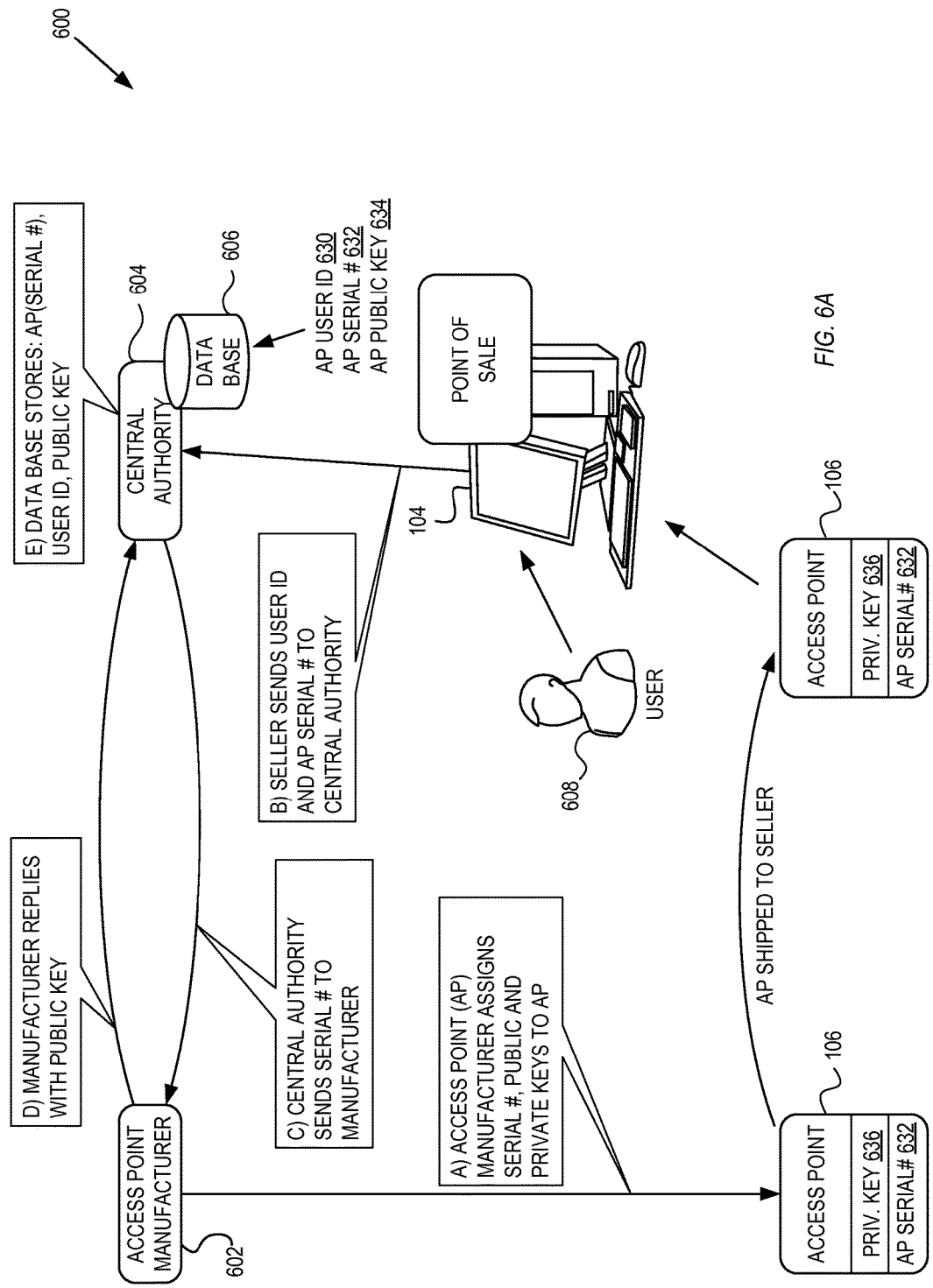
FIGS. 6A-6C a system diagram illustrating still another embodiment of a seamless device configuration method in a communication network.
Figure 6B:
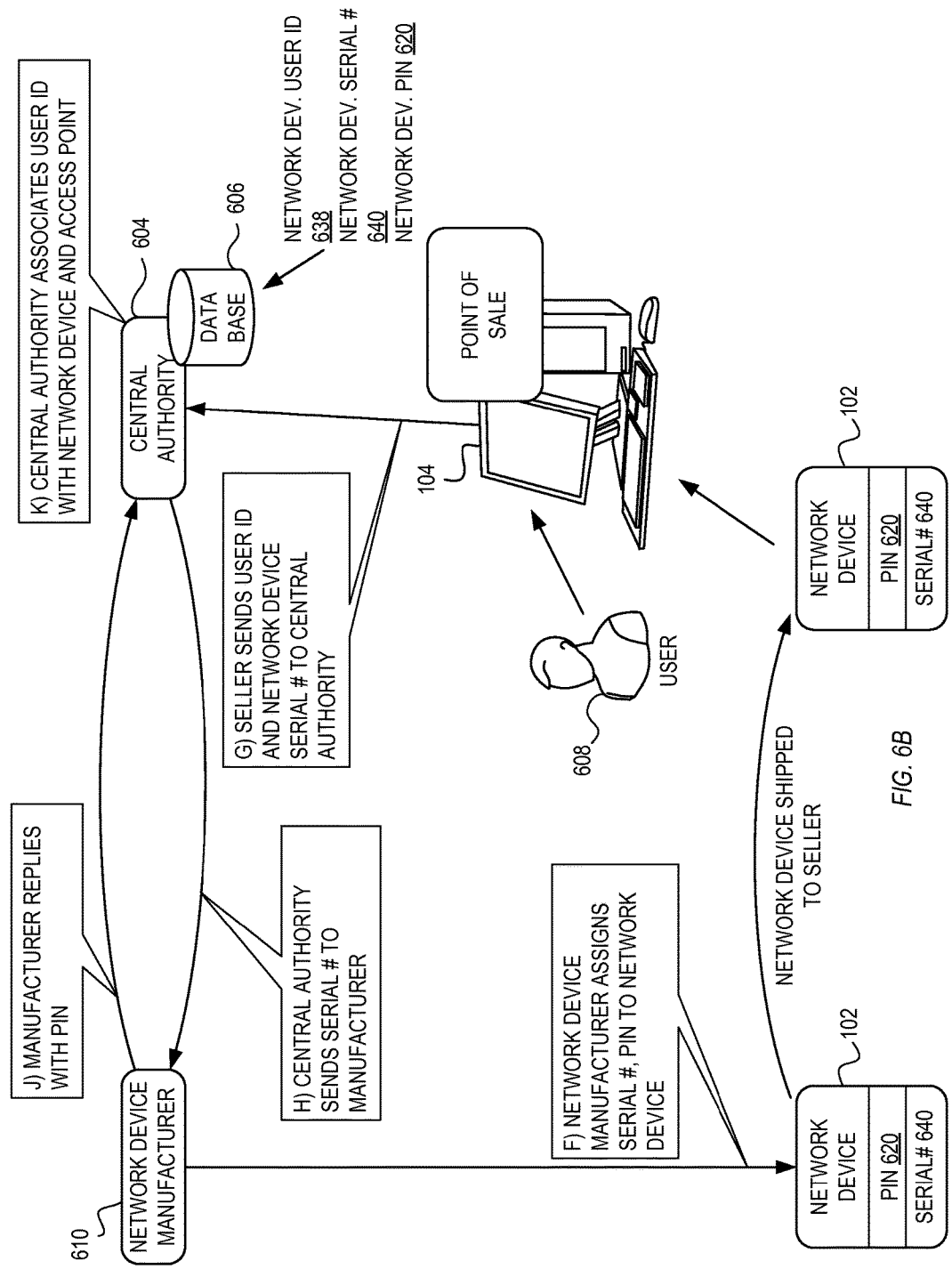
Figure 6C:
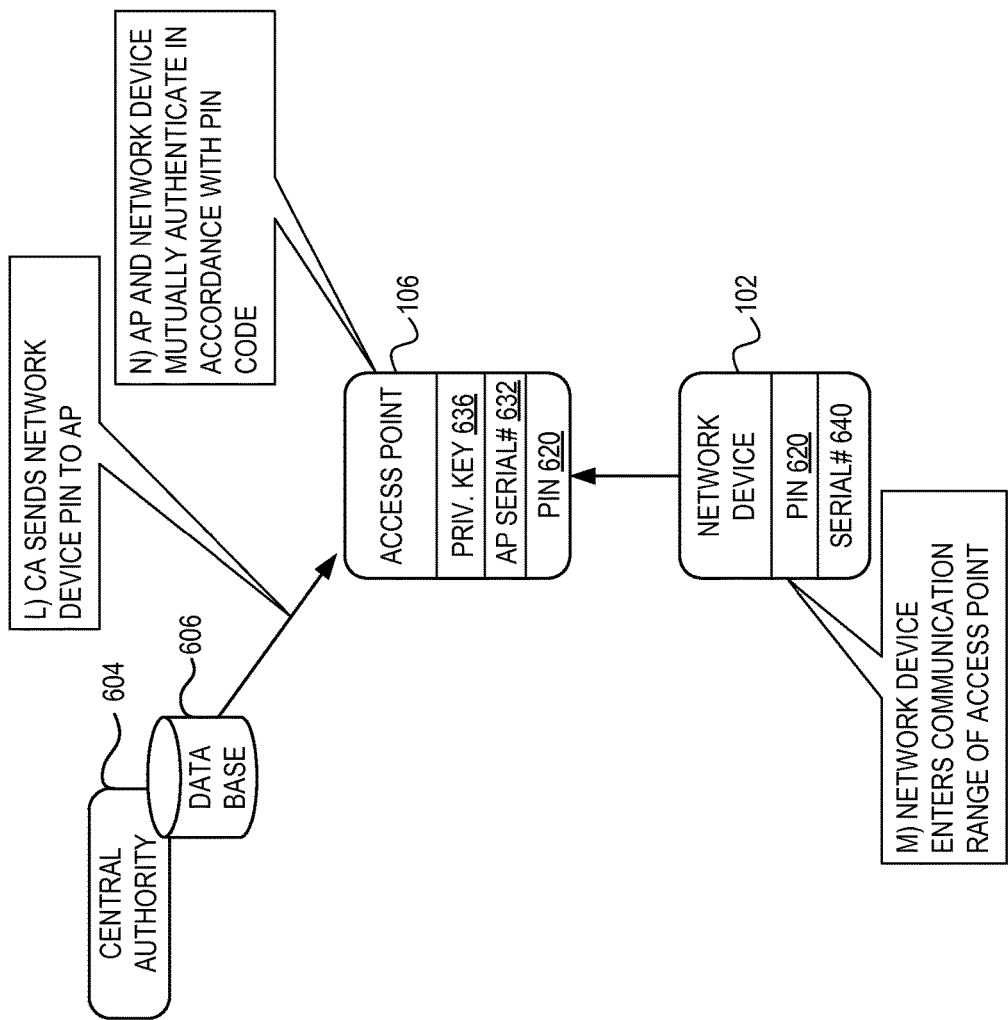

FIGS. 6A-6C is a system diagram 600 illustrating still another embodiment of a seamless device configuration method in a communication network. In an overview of system diagram 600, a central authority can be used to maintain a database of access points, network devices and users. The central authority can associate a network device with an access point when the users associated with these devices can themselves be associated with each other. For example if a user identifier (user ID) associated with a particular access point matches (or is linked to) a user ID associated with a particular network device, and then the central authority can enable the access point to authenticate the network device. In one embodiment, the central authority can send a device credential (such as a PIN code, for example) associated with the network device to the access point. The access point can authenticate the network device when the network device proves its possession of the device credential to the access point. The central authority can send the device credential to the access point before the network device enters within a communication range of the access point.

Turning to FIG. 6A, at stage A, access point manufacturer 602 can assign a serial number 632 and public and private encryption keys (634 and 636 respectively) to access point 106. The use of encryption keys 634, 636 are not essential for the practice of the embodiment described herein; however as will be described below, the encryption keys 634, 636 can enhance protection by protecting access point 106 from unauthorized access. In one embodiment, the private encryption key 636 and serial number 632 can be stored within access point 106. Access point manufacturer 602 can maintain a list (not shown) including the serial numbers of access point 106, and the related public 634 and private 636 encryption keys. After the manufacture of access point 106, access point 106 can be shipped to a seller, reseller, online merchant, etc.

When access point 106 is sold to a user, such as user 608, database 606 maintained by central authority 604 can be updated. To this end, at stage B, the seller of access point 106 can send access point serial number 632, and user ID 630 of user 608 to central authority 604. Access point 106 can be sold at a terminal, such as point of sale terminal 104, or can be sold online. Access point serial number 632 can be determined by examining the packaging or case of access point 106, or in other embodiments, by scanning a label such as a barcode label or a QR code sticker (not shown). Central authority 604 can store user ID 630 and access point serial number 632 in database 606. At stage C, central authority 604 can send the determined access point serial number 632 to access point manufacturer 602. In return, at stage D, access point manufacturer 602 can respond with a public encryption key 634 associated with access point 106. At stage E, database 606 can be updated to include access point serial number 632, user ID 630 and the public encryption key 634 associated with access point 106.

Turning to FIG. 6B, at stage F, network device manufacturer 610 can assign a serial number 640 and a device credential such as PIN code 620 to network device 102. As described above, in other embodiments, other device credentials can be used. The PIN code 620 can be stored within network device 102. In one embodiment, network device manufacturer 610 can maintain a list (not shown) associating PIN codes 620 with network device serial numbers 640.

After the manufacture of network device 102, network device 102 can be shipped to a seller, reseller, online merchant, etc.

When network device 102 is sold, database 606 can be updated with the users' user ID 638 and serial number 640 of network device. 102. To that end, at stage G, the seller can send user ID 638 associated with user 608 and network device serial number 640 to central authority 604. Network device serial number 640 can be determined by examining the packaging or case of network device 102, or in other embodiments, by scanning a label such as a barcode label or a QR code sticker (not shown). At stage H, central authority 604 can send serial number 640 to network device manufacturer 610. In return, at stage J, network device manufacturer 610 can respond with PIN code 620 for network device 102. Central authority 604 can store the PIN code 620, network device serial number 640, and user ID 638 associated with network device 102 in database 606.

Turning to FIG. 6C, the central authority 604 can examine database 606 and can associate network device 102 with access point 106 by noting a common user ID (user IDs 630 and 638). For example if access point user ID 630 is found that matches network device user ID 638, then the central authority 604 can associate network device 102 with access point 106. In another embodiment, user IDs 630 and 638 need not match exactly. That is, a single user ID can be replaced by a list of "equivalent" user IDs that can be viewed by central authority 604 as being the same as one single user ID. In this manner, a group of users can easily be referred to and can be associated with access point 106 or network device 102 for seamless device configuration.

When central authority 604 determines that network device 102 should be associated with access point 106, at stage L, central authority 604 can send PIN code 620 to access point 106. In one embodiment, central authority 604 can send PIN code 620 using encryption such as the public encryption key 634 stored in database 606. Since access point 106 includes private encryption key 636, PIN code 620 can be sent securely (encrypted) from central authority 604 to access point 106. At stage M, network device 102 can be positioned within communication range of access point 106 and can communicate with access point 106. At stage N, access point 106 and network device 102 can mutually authenticate using PIN code 620. For example, access point 106 can authenticate network device 102 when network device 102 proves its possession of the PIN code 620 to access point 106 and the method ends. Proof of possession of the PIN code 620 can be based on, at least in part, Diffie-Hellman, Simultaneous Authentication of Equals (SAE), Wi-Fi Protected Setup (WPS) or any other technically feasible authentication protocol. Although PIN code 620 is used to authenticate network device 102 to access point 106 in this example, any other technically feasible device credential (as described above) can be used.

Although FIGS. 6A-6C describe using public/private key encryption for secure communications between central authority 604 and access point 106, other forms of encryption can be used (symmetric key, or shared key for example). In yet another embodiment, encryption can be ignored and communications between central authority 604 and access point 106 can be clear channel (open with no encryption) communications.

Figure 7:
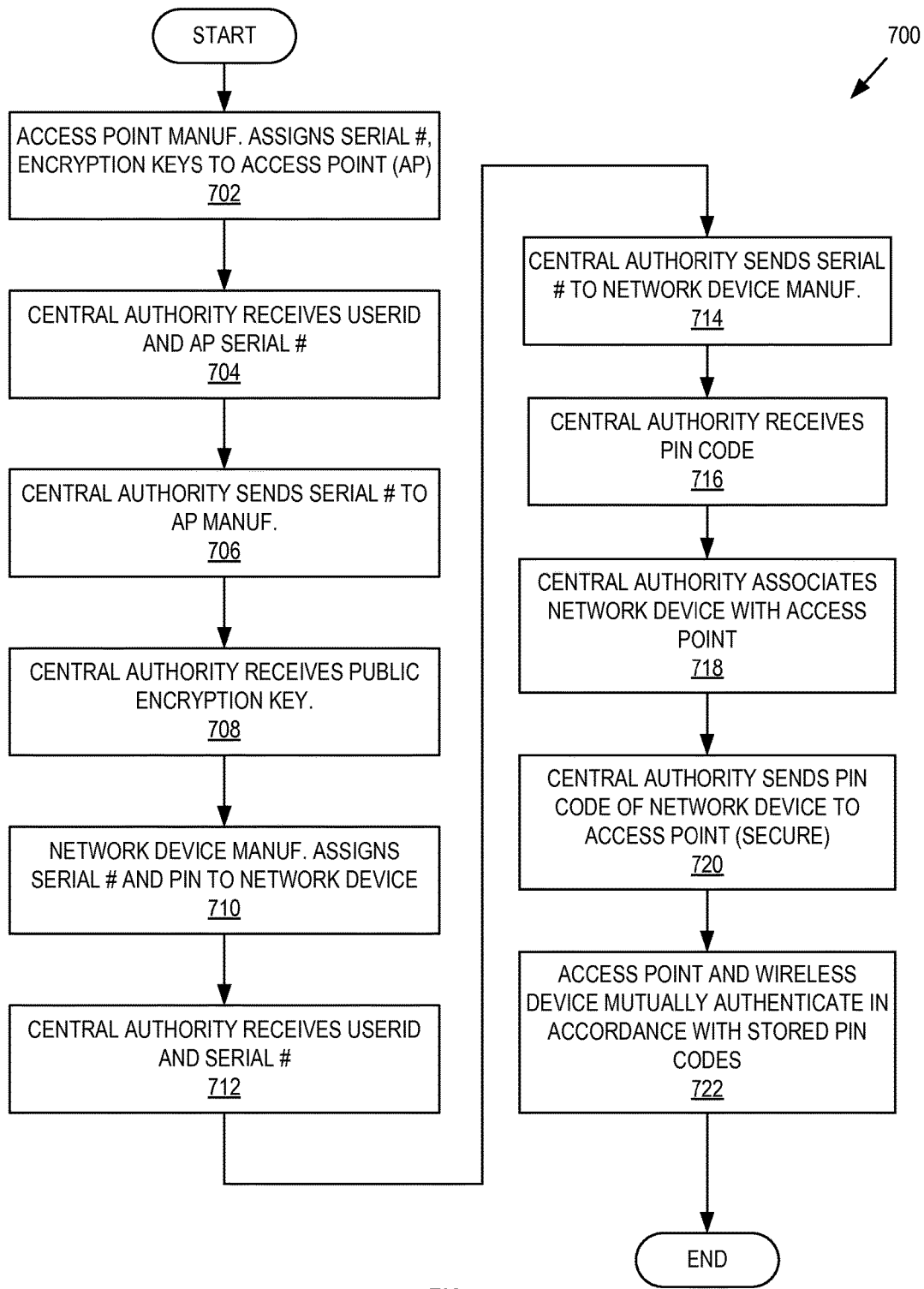
FIG. 7 is a flow diagram illustrating yet another embodiment of example operations for seamless device configuration in a communication network.

FIG. 7 is a flow diagram 700 illustrating yet another embodiment of example operations for seamless device configuration in a communication network. The method of FIG. 7 is described with reference to the systems and components described in FIGS. 6A-6C (for illustration purposes and not as a limitation). The example operations can be carried out by one or more components in system 700 such as terminal 104, a processor within network device 102 or access point 106.

Beginning in block 702, access point manufacturer 602 can assign serial number 632 and public 634 and private 636 encryption keys to access point 106. In one embodiment, serial number 632 can uniquely identify access point 106. Public 634 and private 636 encryption keys can be used for asymmetric encryption for secure transmission of messages. The private encryption key 636 can be stored within access point 106.

Proceeding to block 704, central authority 604 can receive a user ID 630 and a serial number 632 associated with access point 106. The user ID 630 and serial number 632 can be sent to central authority 604 when access point 106 is sold, either through an online sale or a sale occurring at a store at a terminal, such as a point of sale terminal 104. The user ID 630 can be assigned to identify a particular user 608 or group of users (not shown).

Proceeding to block 706, central authority 604 can send serial number 632 to access point manufacturer 602. Communications between central authority 604 and access point manufacturer 602 can be conducted on any technically feasible network, such as the Internet. Proceeding to block 708, central authority 604 can receive the public encryption key 634 from access point manufacturer 602. In one embodiment, the public encryption key 634 can be received in response to access point manufacturer 602 receiving serial number 632 sent in block 706. The public encryption key 634 can enable secure communications with access point 106 to occur, if desired. Central authority 604 can store user ID 630, access point serial number 632 and access point public encryption key 634 in database 606.

Proceeding to block 710, network device manufacturer 610 can assign serial number 640 and PIN code 620 to network device 102. In one embodiment, PIN code 620 can also be stored within network device 102. Proceeding to block 712, central authority 604 can receive user ID 638 and serial number 640 associated with network device 102. The user ID 638 and serial number 640 can be sent to central authority 604 when network device 102 is sold, either through an online sale or a sale occurring at a terminal, such as point of sale terminal 104. Proceeding to block 714, central authority 604 can send network device serial number 640 to network device manufacturer 610. Proceeding to block 716, central authority 604 can receive PIN code 620 associated with network device 102. In one embodiment, PIN code 620 can be received from network device manufacturer 610 in response to receiving serial number 640 of network device 102. Central authority 604 can store user ID 638, network device serial number 640 and PIN code 620 in database 606.

Proceeding to block 718, central authority 604 can associate network device 102 with access point 106, by processing database 606. In one embodiment, the association between network device 102 and access point 106 can be determined by a common user ID associated with both devices. In another embodiment, two or more user IDs can be grouped together and treated as a single user ID. That is, a single user ID can be replaced by a list of "equivalent" user IDs that can be viewed by central authority 604 as being the same as one single user ID. In this manner, a group of users can easily be referred to and can be associated with access point 106 or network device 102.

Proceeding to block 720, central authority 604 can send PIN code 620 to access point 106 before network device 102 communicates with access point 106. PIN code 620 can be stored within access point 106. In one embodiment, PIN code 620 can be sent securely to access point 106 using asymmetric public/private key based encryption using the public encryption key 634 stored in central authority 604 and private encryption key 636 stored in access point 106. Proceeding to block 722, network device 102 and access point 106 can mutually authenticate using PIN code 620 and the flow can end.

It should be understood that FIGS. 1-7 and the operations described herein are examples meant to aid in understanding embodiments and should not be used to limit embodiments or limit scope of the claims. Embodiments may perform additional operations, fewer operations, operations in a different order, operations in parallel, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
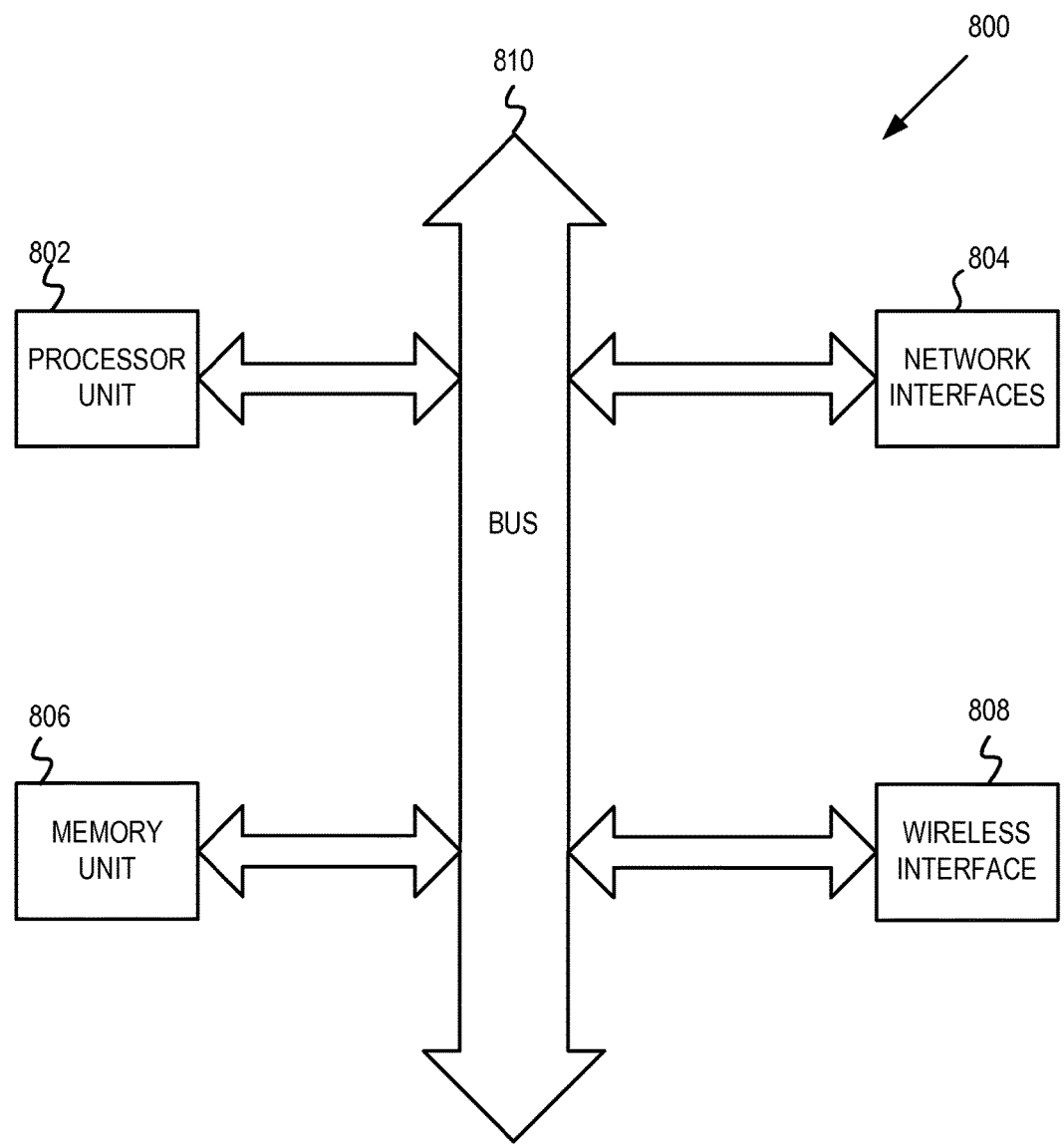
FIG. 8 is a block diagram of an exemplary embodiment of an electronic device including a wireless interface for network communications.

FIG. 8 is a block diagram of an exemplary embodiment of an electronic device 800 including a wireless interface 808 for network communications. In some implementations, the electronic device 800 may be one of a laptop computer, a tablet computer, a mobile phone, a powerline communication device, a smart appliance (PDA), or other electronic systems. The electronic device 800 can include processor unit 802 (possibly including multiple processors, multiple cores, multiple nodes, and/or implementing multi-threading, etc.). The electronic device 800 can also include memory unit 806. Memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Electronic device 800 can also include bus 810 (e.g., PCI, ISA, PCI-Express, HyperTransport®, InfiniBand®, NuBus, AHB, AXI, etc.), and a network interfaces 804 can include wire-based interfaces (e.g., an Ethernet interface, a powerline communication interface, etc.). Wireless interfaces 808 can include at least one of a wireless network interface (e.g., a WLAN interface, a Bluetooth interface, a WiMAX interface, a ZigBee interface, a Wireless USB interface, etc.), In some implementations, electronic device 800 may support multiple network interfaces—each of which is configured to couple the electronic device 800 to a different communication network.

The memory unit 806 embodies functionality to implement embodiments described above. The memory unit 806 may include one or more functionalities that facilitate seamless device configuration. For example, memory unit 806 can implement one or more aspects of terminal 104, access point 106 or central authority 604 as described above.

The memory unit 806 can embody functionality to implement embodiments described in FIGS. 1-7 above. In one embodiment, memory unit 806 can include one or more functionalities that facilitate sending and receiving PIN codes, identifier codes, serial numbers, encryption keys, and the like. Memory unit 806 can also facilitate maintaining a database, and authenticating a device, such as a network device 102. Memory unit 806 can also be used to provide persistent storage of data such as database 606. Any one of these functionalities may be partially (or entirely) implemented in hardware and/or on the processor unit 802. For example, some functionality may be implemented with an application specific integrated circuit, in logic implemented in the processor unit 802, in a co-processor on a peripheral device or card, etc. Further, realizations may include fewer or additional components not illustrated in FIG. 8 (e.g., video cards, audio cards, additional network interfaces, peripheral devices, etc.). Processor unit 802, memory unit 806, network interface 804 and wireless interface 808 are coupled to bus 810. Although illustrated as being coupled to the bus 810, memory unit 806 may be coupled to processor unit 802.

While the embodiments are described with reference to various implementations and exploitations, it will be understood that these embodiments are illustrative and that the scope of the inventive subject matter is not limited to them. In general, techniques for seamless device configuration as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of device authentication comprising:
  receiving, at a first device in a first network, a device credential for a second device before the second device has communicated with an access point of a second network;
  identifying a user device associated with the second network, the user device configured to forward the device credential to the access point in response to an indication that a first user identifier associated with the access point is related to a second user identifier associated with the second device, wherein the first user identifier and the second user identifier are different; and
  transmitting the device credential from the first device to the user device for the user device to forward the device credential to the access point, wherein the device credential authenticates the second device for communication with the access point prior to the second device communicating with the access point.

2. The method of claim 1, wherein the user device is a cellular modem integrated within the access point.

3. The method of claim 2, wherein transmitting the device credential comprises transmitting a short message service (SMS) message.

4. The method of claim 3, further comprising,
  determining whether a source of the SMS message is verified, and
  ignoring the SMS message if the source is not verified.

5. The method of claim 1, wherein the user device is a cellular phone identified by a phone number.

6. The method of claim 1, wherein the users device is configured to forward the device credential to the access point after receiving an indication of approval that the second device is allowed to authenticate with the access point.

7. The method of claim 1, wherein the device credential is stored at the second device prior to deployment of the second device.

8. The method of claim 1, wherein
  the device credential comprises at least one member of a group consisting of a Personal Identification Number and a Device Password, and
  the device credential is associated with the second device prior to deployment of the second device.

9. The method of claim 1, wherein receiving the device credential comprises using a scanner to read a quick response (QR) code associated with the second device.

10. The method of claim 1, wherein receiving the device credential comprises using a scanner to read a barcode associated with the second device.

11. The method of claim 1, wherein receiving the device credential comprises reading a near field communication tag associated with the second device.

12. The method of claim 1, further comprising receiving a validation phrase in response to transmitting the device credential.

13. The method of claim 1, wherein the device credential is an encrypted device credential.

14. The method of claim 13, further comprising transmitting, from the first device to a third device, the encrypted device credential, wherein the third device decrypts the encrypted device credential and provides the decrypted device credential to the second device.

15. The method of claim 14, further comprising transmitting an identity of the user device to the third device.

16. The method of claim 15, wherein the identity of the user device is a phone number.

17. The method of claim 14, wherein transmitting the encrypted device credential comprises determining that the user device received approval that the second device is allowed to authenticate with the access point.

18. A method of device authentication comprising:
generating, at a first device in a first network, a one-time password for a second device before the second device has communicated with an access point of a second network;
transmitting the one-time password to the second device for storage at the second device;
identifying a user device associated with the second network, the user device configured to forward the one-time password to the access point in response to an indication that a first user identifier associated with the access point is related to a second user identifier associated with the second device, wherein the first user identifier and the second user identifier are different; and
transmitting the one-time password from the first device to the user device for the user device to forward the one-time password to the access point, wherein the one-time password authenticates the second device for communication with the access point prior to the second device communicating with the access point.

19. The method of claim 18, wherein the user device is a cellular phone identified by a phone number.

20. The method of claim 19, wherein transmitting the one-time password comprises transmitting a short message service (SMS) message to the cellular phone.

21. The method of claim 18, wherein the user device is configured to forward the one-time password after receiving an indication of approval that the second device is allowed to authenticate with the access point.

22. A method performed by a user device comprising:
receiving, by the user device from a first device in a first network, a device credential for a second device before the second device has communicated with an access point of a second network;
associating a first user identifier with the access point;
associating a second user identifier with the second device; and
forwarding the device credential from the user device to the access point in response to a determination that the first user identifier is associated with related to the second user identifier, wherein the first user identifier and the second user identifier are different, and wherein the device credential authenticates the second device for communication with the access point prior to the second device communicating with the access point.

23. The method of claim 22, further comprising receiving the second user identifier from a point of sale.

24. The method of claim 22, further comprising:
receiving an access point credential from the access point;
transmitting the access point credential to a manufacturer of the access point in response to receiving the access point credential; and
receiving a public encryption key associated with the access point.

25. The method of claim 24, wherein the access point credential is a serial number.

26. The method of claim 24, wherein transmitting the device credential to the access point comprises transmitting the device credential using a secure connection to the access point.

27. The method of claim 24, wherein a private encryption key is stored at the access point.

28. The method of claim 22, wherein the device credential is a personal identification number (PIN) code.

29. The method of claim 22, further comprising storing the first user identifier, the device credential, and the second user identifier in a database.

30. The method of claim 22, wherein the first user identifier and the second user identifier are associated with different users.

31. A first device comprising:
a processor; and
a memory coupled with the processor, the memory storing instructions which, when executed by the processor, cause the first device to,
receive, in a first network, a device credential for a second device before the second device has communicated with an access point of a second network,
identify a user device associated with the second network, the user device configured to forward the device credential to the access point in response to an indication that a first user identifier associated with the access point is related to a second user identifier associated with the second device, wherein the first user identifier and the second user identifier are different, and
transmit the device credential from the first device to the user device for the user device to forward the device credential to the access point, wherein the device credential authenticates the second device for communication with the access point prior to the second device communicating with the access point.

32. The first device of claim 31, wherein the user device is configured to forward the device credential to the access point after receiving an indication of approval that the second device is allowed to authenticate with the access point.

33. The first device of claim 31, wherein the user device is configured to forward the device credential to the access point using a short message service (SMS) message.

34. The first device of claim 33, wherein the access point comprises a cellular modem configured to receive the SMS message from the user device.

35. The first device of claim 31, wherein the device credential is an encrypted device credential.

36. The first device of claim 35, wherein the instructions, when executed, further cause the first device to,
transmit the encrypted device credential to a fourth device, wherein the fourth device is configured to decrypt the encrypted device credential and provide a decrypted device credential to the second device.

37. The first device of claim 36, wherein the instructions, when executed, further cause the first device to transmit the encrypted device credential in response to determining that the user device received approval that the second device is allowed to authenticate with the access point.

38. A non-transitory machine-readable medium having instructions stored therein, wherein the instructions, when executed by a processor of a first device, cause the first device to:
receive, at the first device in a first network, a device credential for a second device before the second device has communicated with an access point of a second network;
identify a user device associated with the second network, the user device configured to forward the device credential to the access point in response to an indication that a first user identifier associated with the access point is related to a second user identifier associated with the second device, wherein the first user identifier and the second user identifier are different; and transmit the device credential from the first device to the user device for the user device to forward the device credential to the access point, wherein the device credential authenticates the second device for communication with the access point prior to the second device communicating with the access point.

39. The non-transitory machine-readable medium of claim 38, wherein the user device is configured to forward the device credential after receiving an indication of approval that the second device is allowed to authenticate with the access point.

40. The non-transitory machine-readable medium of claim 38, wherein the instructions to transmit the device credential comprise instructions to forward the device credential using a short message service message (SMS).

41. The non-transitory machine-readable medium of claim 38, wherein the device credential is an encrypted device credential.

42. The non-transitory machine-readable medium of claim 41, wherein the instructions are further to, transmit, from the first device to a fourth device, the encrypted device credential, wherein the fourth device is configured to decrypt the encrypted device credential and provide the decrypted device credential to the user device.

43. The non-transitory machine-readable medium of claim 42, wherein the instructions are further to transmit the encrypted device credential in response to determining that the user device received approval that the second device is allowed to authenticate with the access point.

44. A user device comprising:
a processor; and
a memory coupled with the processor, the memory storing instructions which, when executed by the processor, cause the apparatus to,
receive, by the user device from a first device in a first network, a device credential for a second device before the second device has communicated with an access point of a second network;
associate a first user identifier with the access point;
associate a second user identifier with the second device; and
forward the device credential from the user device to the access point in response to a determination that the first user identifier is related to the second user identifier, wherein the first user identifier and the second user identifier are different, and wherein the device credential authenticates the second device for communication with the access point prior to the second device communicating with the access point.

45. The user device of claim 44, further comprising receiving the second user identifier from a point of sale.

46. The user device of claim 44, wherein the device credential is a personal identification number (PIN) code.

47. The user device of claim 44, wherein the first user identifier and the second user identifier are associated with different users.

48. The user device of claim 44, wherein the apparatus comprises a cellular modem or radio integrated with the access point.

49. The user device of claim 44, wherein the apparatus comprises a user device capable of communicating with the access point.

* * * * *